(12) United States Patent
Tsukashima

(10) Patent No.: US 11,052,767 B2
(45) Date of Patent: Jul. 6, 2021

(54) MOTOR VEHICLE

(71) Applicant: Toyota Jidosha Kabushiki Kaisha, Toyota (JP)

(72) Inventor: Hiroyuki Tsukashima, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 313 days.

(21) Appl. No.: 16/247,010

(22) Filed: Jan. 14, 2019

(65) Prior Publication Data

US 2019/0217723 A1 Jul. 18, 2019

(30) Foreign Application Priority Data

Jan. 15, 2018 (JP) .............................. JP2018-003984

(51) Int. Cl.
*B60L 15/20* (2006.01)
*B60W 20/15* (2016.01)
(Continued)

(52) U.S. Cl.
CPC ................ *B60L 15/20* (2013.01); *B60K 1/02* (2013.01); *B60K 17/354* (2013.01); *B60W 10/08* (2013.01); *B60W 20/15* (2016.01); *B60L 2240/423* (2013.01); *B60L 2240/642* (2013.01); *B60L 2240/647* (2013.01); *B60W 2520/263* (2013.01); *B60W 2552/15* (2020.02); *B60W 2552/40* (2020.02); *B60W 2710/083* (2013.01);
(Continued)

(58) Field of Classification Search
CPC ........ B60K 17/354; B60K 1/02; B60K 6/445; B60K 6/46; B60K 6/48; B60K 6/52; B60L 15/20; B60L 15/2036; B60W 10/08; B60W 20/15; B60W 2520/263; B60W 2552/15; B60W 2552/40; B60W 2710/083; B60W 2720/403; B60W 30/18172; B60Y 2200/91; B60Y 2200/92; Y02T 10/62; Y02T 10/64; Y02T 10/70; Y02T 10/7072; Y02T 10/72
See application file for complete search history.

(56) References Cited

U.S. PATENT DOCUMENTS 5,894,904 A * 4/1999 Yakou ................ B60K 23/0808
180/197
6,549,840 B1 * 4/2003 Mikami ................ B60W 10/06
701/69

(Continued)

FOREIGN PATENT DOCUMENTS

JP 2006240400 A 9/2006
JP 2010228689 A 10/2010

*Primary Examiner* — Tyler J Lee
(74) *Attorney, Agent, or Firm* — Dinsmore & Shohl LLP

(57) ABSTRACT

The motor vehicle comprises a first motor configured to drive front wheels; a second motor configured to drive rear wheels; and a control device configured to control the first motor and the second motor, such that the motor vehicle is driven with a required torque for driving. The control device controls the first motor and the second motor to set a larger value to a rear wheel distribution ratio that is a ratio of a torque of the rear wheels to the required torque, when the motor vehicle runs on a low μ road having a road surface friction coefficient equal to or less than a predetermined value and is currently turned, compared with a value when the motor vehicle does not run on the low μ road or when the motor vehicle is not currently turned.

5 Claims, 6 Drawing Sheets

(51) Int. Cl.
    *B60K 17/35*     (2006.01)
    *B60W 10/08*     (2006.01)
    *B60K 17/354*     (2006.01)
    *B60K 1/02*     (2006.01)

(52) U.S. Cl.
    CPC .... *B60W 2720/403* (2013.01); *B60Y 2200/91* (2013.01); *B60Y 2200/92* (2013.01)

(56) References Cited

U.S. PATENT DOCUMENTS

| | | | |
|---|---|---|---|
| 8,321,110 B2 * | 11/2012 | Post, II | B60K 23/0808 701/69 |
| 10,221,931 B2 * | 3/2019 | Nasu | B60K 17/354 |
| 10,583,824 B2 * | 3/2020 | Sasaki | B60K 17/02 |
| 10,696,322 B2 * | 6/2020 | Sato | B62D 5/0481 |
| 2004/0050597 A1 * | 3/2004 | Ai | B60K 6/52 180/65.235 |
| 2006/0196714 A1 * | 9/2006 | Sugimoto | B60W 10/06 180/242 |
| 2007/0129871 A1 * | 6/2007 | Post, II | B60K 28/165 701/69 |
| 2011/0307129 A1 * | 12/2011 | Yu | B60L 3/102 701/22 |
| 2012/0166055 A1 * | 6/2012 | Ozawa | B60K 17/348 701/69 |
| 2014/0162842 A1 * | 6/2014 | Severinsson | B60W 10/16 477/35 |
| 2017/0210414 A1 * | 7/2017 | Sato | B62D 6/003 |
| 2017/0328461 A1 * | 11/2017 | Nasu | F16H 57/12 |
| 2018/0154882 A1 * | 6/2018 | Sasaki | B60K 17/046 |

\* cited by examiner

MOTOR VEHICLE

CROSS-REFERENCE TO RELATED APPLICATIONS

The present disclosure claims priority to Japanese Patent Application No. 2018-003964 filed Jan. 15, 2018, which is incorporated herein by reference in its entirety including specification, drawings and claims.

TECHNICAL FIELD

The present disclosure relates to a motor vehicle and more specifically relates to a motor vehicle equipped with a first motor configured to drive front wheels and a second motor configured to drive rear wheels.

BACKGROUND

In a motor vehicle equipped with a front motor configured to drive front wheels and a rear motor configured to drive rear wheels, a proposed configuration performs feed forward control that increases the driving force of the rear wheels with an increase in amount of steering operation (as described in, for example, JP 2006-240400A). This motor vehicle has a stable turning behavior at the time of a steering operation by such control.

SUMMARY

The motor vehicle of the above configuration sets the driving force of the rear wheels at the time of a steering operation, whether the current driving road is a low μ road such as a wet road surface. This is likely to cause insufficient turning performance (line traceability and stability) on the low μ road.

An object of a motor vehicle of the present disclosure is to ensure good turning performance on a low μ road.

In order to achieve the above object, the motor vehicle of the present disclosure employs the following configuration.

The present disclosure is directed to a motor vehicle. The motor vehicle includes a first motor configured to drive front wheels, a second motor configured to drive rear wheels and a control device configured to control the first motor and the second motor such that the motor vehicle is driven with a required torque for driving. The control device controls the first motor and the second motor to set a larger value to a rear wheel distribution ratio that is a ratio of a torque of the rear wheels to the required torque, when the motor vehicle runs on a low μ road having a road surface friction coefficient equal to or less than a predetermined value and is currently turned, compared with a value when the motor vehicle does not run on the low μ road or when the motor vehicle is not currently turned.

The motor vehicle of this aspect controls the first motor and the second motor to set the larger value to the rear wheel distribution ratio that is the ratio of the torque of the rear wheels to the required torque, when the motor vehicle runs on the low μ road having the road surface friction coefficient equal to or less than the predetermined value and is currently turned, compared with the value when the motor vehicle does not run on the low μ road or when the motor vehicle is not currently turned. This configuration ensures good turning performance (line traceability and stability) on the low μ road. The "low μ road" may be, for example, a driving road that is likely to cause an idling-induced slip in the front wheels or in the rear wheels, such as a wet road surface, a snow-covered road surface or a frozen road surface.

DETAILED DESCRIPTION

The following describes some aspects of the disclosure with reference to embodiments.

Figure 1:
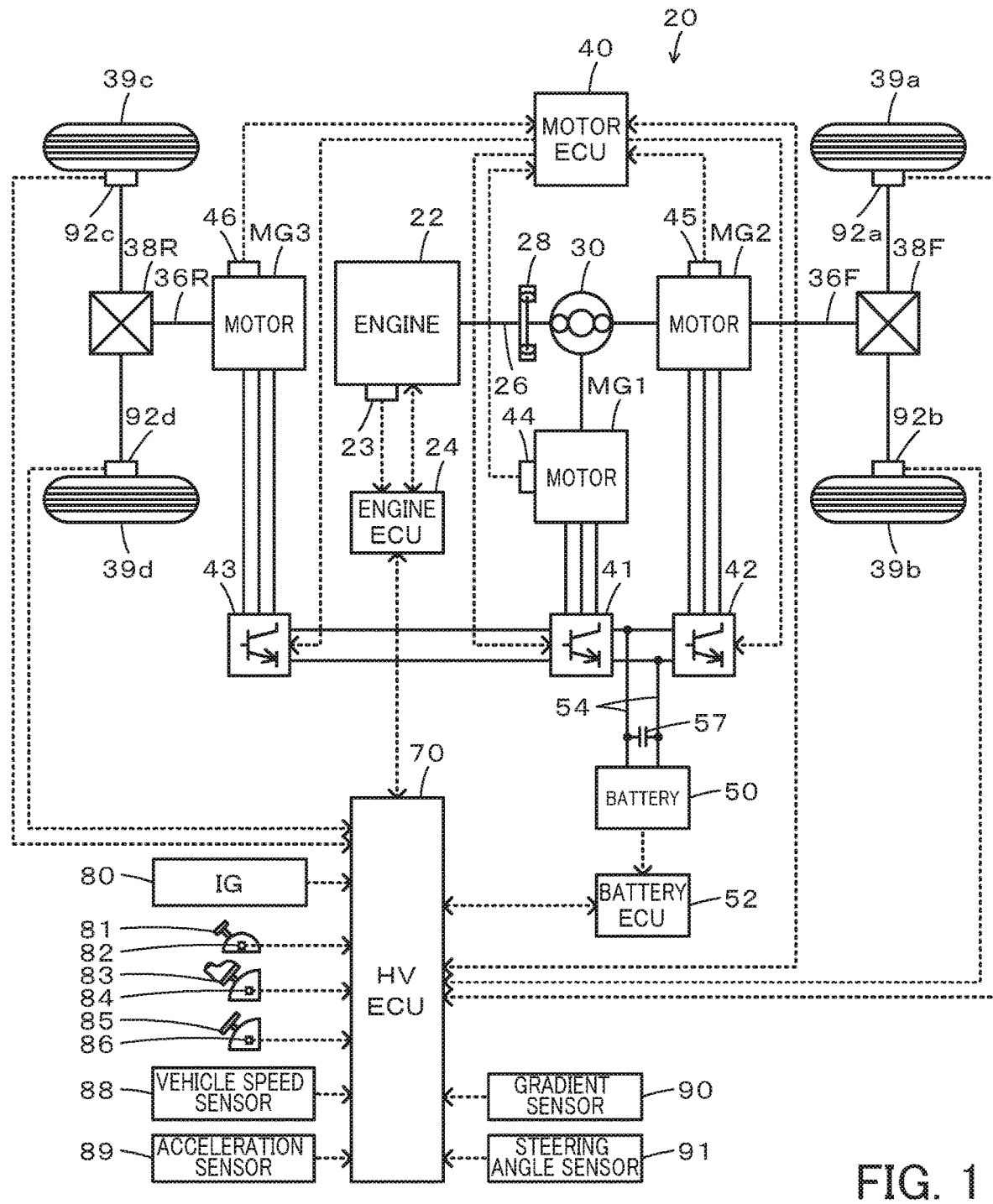
FIG. 1 is a configuration diagram illustrating the schematic configuration of a hybrid vehicle according to one embodiment.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1, MG2 and MG3, inverters 41, 42 and 43, a battery 50 serving as a power storage device, and a hybrid electronic control unit (hereinafter referred to as "HVECU") 70.

The engine 22 is configured as an internal combustion engine that outputs power using, for example, gasoline or light oil as a fuel and is connected with a carrier of the planetary gear 30 via a damper 28. The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr input from the crank position sensor 23.

The planetary gear 30 is configured as a single pinion-type planetary gear mechanism. The planetary gear 30 includes a sun gear that is connected with a rotor of the motor MGX. The planetary gear 30 also includes a ring gear that is connected with a driveshaft 36F linked with front wheels 39a and 39b via a differential gear 38F. The planetary gear 30 also includes a carrier that is connected with the crankshaft 26 of the engine 22 via a damper 28.

The motor MG1 is configured as a synchronous motor generator having a rotor with permanent magnets embedded therein and a stator with three-phase coils wound thereon and includes the rotor that is connected with the sun gear of the planetary gear 30 as described above. Like the motor MG1, the motor MG2 is also configured as a synchronous motor generator and includes a rotor that is connected with the driveshaft 36F. Like the motors MG1 and MG2, the motor MG3 is also configured as a synchronous motor generator and includes a rotor that is connected with a driveshaft 36R coupled with rear wheels 39c and 39d via a differential gear 38R. The inverters 41, 42 and 43 are respectively used to drive the motors MG1, MG2 and MG3 and are connected with the battery 50 via power lines 54. A capacitor 57 for smoothing is mounted to the power lines 54. A motor electronic control unit (hereinafter referred to as "motor ECU") 40 performs switching control of a plurality of switching elements (not shown) included in the respective inverters 41, 42 and 43 to rotate and drive the motors MG1, MG2 and MG3.

The motors MG1 and MG2 are located together with the engine 22 and the planetary gear 30 on the front wheels 39a, 39b-side (in a front portion of the vehicle, for example, in an engine room), whereas the motor MG3 is located on the rear wheels 39c, 39d-side (in a rear portion of the vehicle). The motors MG1, MG2 and MG3 are cooled down by the driving wind or cooling water. The cooling water flows in a circulation flow path that is arranged to pass through a radiator, the motors MG1, MG2 and MG3 and the inverters 41, 42 and 43, by driving an electric pump. Compared with the motors MG1 and MG2, the motor MG3 is unlikely to be sufficiently cooled down due to reasons such that the motor MG3 is unlikely to be sufficiently exposed to the driving wind and that the motor MG3 is distant from the radiator.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1, MG2 and MG3 are input into the motor ECU 40 via the input port. The signals input into the motor ECU 40 include, for example, rotational positions θm1, θm2 and θm3 from rotational position detection sensors 44, 45 and 46 configured to detect the rotational positions of the respective rotors of the motors MG1, MG2 and MG3 and phase currents Iu1, Iv1, Iu2, Iv2, Iu3 and Iv3 from current sensors (not shown) configured to detect the phase currents flowing in the respective phases of the motors MG1, MG2 and MG3. The motor ECU 40 outputs, for example, switching control signals to the plurality of switching elements included in the respective inverters 41, 42 and 43 via the output port. The motor ECU 40 is connected with the HVECU 70 via the respective communication ports. The motor ECU 40 calculates electrical angles θe1, θe2 and θe3, angular velocities ωm1, ωm2 and ωm3 and rotation speeds Nm1, Nm2 and Nm3 of the respective motors MG1, MG2 and MG3, based on the rotational positions θm1, θm2 and θm3 of the respective rotors of the motors MG1, MG2 and MG3 input from the rotational position detection sensors 44, 45 and 46.

The battery 50 is configured, for example, as a lithium ion secondary battery or a nickel metal hydride secondary battery. This battery 50 is connected with the inverters 41, 42 and 43 via the power lines 54 as described above. The battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor (not shown) placed between terminals of the battery 50, an electric current Ib of the battery 50 from a current sensor (not shown) mounted to an output terminal of the battery 50, and a temperature Tb of the battery 50 from a temperature sensor (not shown) mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor (not shown). The state of charge SOC denotes a ratio of an accumulated amount of electricity (amount of electric power dischargeable from the battery 50) to the overall capacity of the battery 50.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect the operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, a vehicle speed V from a vehicle speed sensor 88, and an acceleration α from an acceleration sensor 89. The input signals further include a road surface gradient θrd (which takes a positive value in an ascending slope) from a gradient sensor 90 configured to detect the road surface gradient, a steering angle θs from a steering angle sensor 91 configured to detect the steering angle, and wheel speeds Vwa to Vwd from wheel speed sensors 92a to 92d respectively mounted to the front wheels 39a and 39b and the rear wheels 39c and 39d. The HVECU 70 is connected with the engine ECU 24, the motor ECU 40 and the battery ECU 52 via the respective communication ports as described above.

The hybrid vehicle 20 of the embodiment having the above configuration is driven with changing over its drive mode among a plurality of drive modes including a hybrid drive (HV drive) mode in which the hybrid vehicle 20 is driven with operation of the engine 22 and a motor drive (EV drive) mode in which the hybrid vehicle 20 is driven without operation of the engine 22.

In the HV drive mode, the hybrid vehicle 20 is basically driven as described below. The HVECU 70 first sets a required torque Td* that is required for driving, based on the accelerator position Acc and the vehicle speed V, and also sets a required power Pd* that is required for driving, based on the set required torque Td* and the vehicle speed V. The HVECU 70 subsequently calculates a required power Pe* that is required for the vehicle (or more specifically, that is required for the engine 22) by subtracting a charge-discharge required power Pb* (which takes a positive value when the battery 50 is discharged) based on the state of charge SOC of the battery 50 from the required power Pd*. The HVECU 70 then sets a rear wheel distribution ratio kr that is a ratio of a rear wheel torque Tr to the sum of a front wheel torque Tf and the rear wheel torque Tr. A method of setting the rear wheel distribution ratio kr will be described later.

The HVECU 70 subsequently calculates a front wheel required torque Tf* that is required for the front wheels 39a and 39b by multiplying the required torque Td* by a result of subtraction of the rear wheel distribution ratio kr from a value 1, and calculates a rear wheel required torque Tr* that is required for the rear wheels 39c and 39d by multiplying the required torque Td* by the rear wheel distribution ratio kr. The HVECU 70 then sets a target rotation speed Ne* and a target torque Te* of the engine 22 and torque commands Tm1*, Tm2* and Tm3* of the respective motors MG1, MG2 and MG3, such that the required power Pe* is output from the engine 22 and that the front wheel required torque Tf* is output to the front wheels 39a and 39b and the rear wheel required torque Tr* is output to the rear wheels 39c and 39d. The HVECU 70 sends the target rotation speed Ne* and the target torque Te* of the engine 22 to the engine ECU 24, while sending the torque commands Tm1*, Tm2* and Tm3* of the respective motors MG1, MG2 and MG3 to the motor ECU 40. The engine ECU 24 performs intake air flow control, fuel injection control and ignition control, such that the engine 22 is operated at the target rotation speed Ne* and with the target torque Te*. The motor ECU 40 performs switching control of the plurality of switching elements included in the respective inverters 41, 42 and 43, such that the motors MG1, MG2 and MG3 are respectively driven with the torque commands Tm1*, Tm2* and Tm3*.

In the EV drive mode, the hybrid vehicle 20 is basically driven as described below. As in the HV drive mode, the HVECU 70 sets the required torque Td*, sets the rear wheel distribution ratio kr, and calculates the front wheel required torque Tf* and the rear wheel required torque Tr*. The HVECU 70 subsequently sets a value 0 to the torque command Tm1* of the motor MG1 and sets the torque commands Tm2* and Tm3* of the motors MG2 and MG3, such that the front wheel required torque Tf* is output to the front wheels 39a and 39b and the rear wheel required torque Tr* is output to the rear wheels 39c and 39d. The HVECU 70 then sends the torque commands Tm1*, Tm2* and Tm3* of the respective motors MG1, MG2 and MG3 to the motor ECU 40. The motor ECU 40 controls the inverters 41, 42 and 43 in the same manner as that described above with regard to the HV drive mode.

Figure 2:
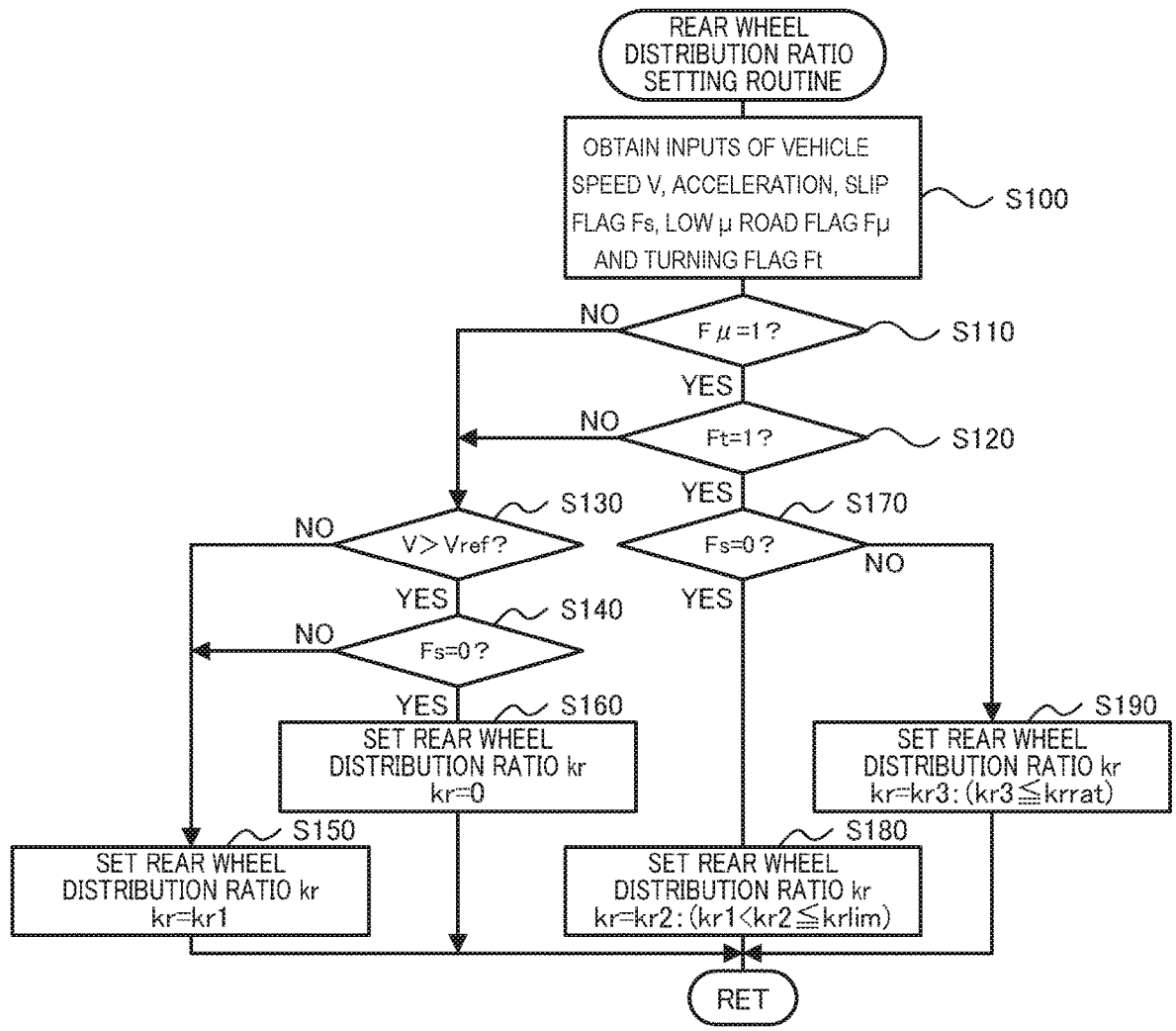
FIG. 2 is a diagram showing one example of a rear wheel distribution ratio setting routine performed by the HVECU.

The following describes the operations of the hybrid vehicle 20 of the embodiment having the above configuration or more specifically a series of operations to set the rear wheel distribution ratio kr. FIG. 2 is a diagram showing one example of a rear wheel distribution ratio setting routine performed by the HVECU 70. This routine is performed repeatedly.

When the rear wheel distribution ratio setting routine is triggered, the HVECU 70 first obtains the inputs of data, for example, the vehicle speed V, the acceleration α, a slip flag Fs, a low μ road flag Fμ and a turning flag Ft (step S100). The vehicle speed V input here is a value detected by the vehicle speed sensor 88. The acceleration α input here is a value detected by the acceleration sensor 89.

The slip flag Fs input here is a value set by a slip determination routine (not shown) that is performed in parallel to this routine by the HVECU 70. In the slip determination routine, the HVECU 70 determines whether an idling-induced slip occurs in either of the front wheels 39a and 39b and the rear wheels 39c and 39d, based on the wheel speeds Vwa to Vwd of the front wheels 39a and 39b and of the rear wheels 39c and 39d from the wheel speed sensors 92a to 92d, for example, by comparing differences between the respective wheel speeds Vwa to Vwd and the third largest or the fourth largest wheel speed among the wheel speeds Vwa to Vwd with a reference value Vwref1. When it is determined that no idling-induced slip occurs in either of the front wheels 39a and 39b and the rear wheels 39c and 39d (when no slip is detected), a value 0 is set to the slip flag Fs. When it is determined that an idling-induced slip occurs in either of the front wheels 39a and 39b and the rear wheels 39c and 39d (when a slip is detected), on the other hand, a value 1 is set to the slip flag Fs.

The low μ road flag Fμ input here is a value set by a low μ road determination routine (not shown) that is performed in parallel to the rear wheel distribution ratio setting routine by the HVECU 70. In the low μ road determination routine, the HVECU 70 determines whether the current driving road is a low μ road having a road surface friction coefficient equal to or lower than a threshold value (for example, 0.3, 0.35 or 0.4), based on the wheel speeds Vwa to Vwd of the front wheels 39a and 39b and of the rear wheels 39c and 39d from the wheel speed sensors 92a to 92d, for example, by comparing a degree of variation in the wheel speeds Vwa to Vwd (difference between the first largest and the fourth largest wheel speeds among the wheel speeds Vwa to Vwd) with a reference value Vwref2 that is smaller than the reference value Vwref1. The low μ road may be, for example, a driving road that is likely to cause an idling-induced slip in the front wheels or in the rear wheels, such as a wet road surface, a snow-covered road surface or a frozen road surface. When it is determined that the current driving road is not a low μ road, a value 0 is set to the low μ road flag Fμ. When it is determined that the current driving road is a low μ road, on the other hand, a value 1 is set to the low μ road flag Fμ. According to a modification, the HVECU 70 may determine whether the current driving road is a low μ road, in response to the user's ON operation of a low μ road switch (not shown).

The turning flag Ft input here is a value set by a turning determination routine (not shown) that is performed in parallel to the rear wheel distribution ratio setting routine by the HVECU 70. In the turning determination routine, the HVECU 70 determines whether the vehicle is currently turned, for example, by comparing the absolute value of the steering angle θs from the steering angle sensor 91 with a reference value θsref. When it is determined that the vehicle is not currently turned (but runs straight), a value 0 is set to the turning flag Ft. When it is determined that the vehicle is currently turned, on the other hand, a value 1 is set to the turning flag Ft.

After obtaining the input data, the HVECU 70 checks the value of the low μ road flag Fμ (step S110). When the low μ road flag Fμ is equal to the value 0, the HVECU 70 determines that the current driving road is not a low μ road and compares the vehicle speed V with a reference value Vref (step S130). The reference value Vref used here may be, for example, 20 km/h, 25 km/h or 30 km/h.

When the vehicle speed V is equal to or lower than the reference value Vref at step S130, the HVECU 70 sets a value kr1 (for example, about 0.4 to 0.55) to the rear wheel distribution ratio kr (step S150) and then terminates this routine. A value corresponding to a dynamic load distribution is set to the value kr1, based on the acceleration α. According to the embodiment, a relationship of the value kr1 to the acceleration α is determined and stored in advance in the form of a map in the ROM (not shown). The value kr1 corresponding to a given value of the acceleration α is read from this map. According to a modification, the value kr1 may be set, based on the steering angle θs as well as the acceleration α, such as to ensure the good turning performance (line traceability and stability) with taking into account the dynamic load distribution.

When the vehicle speed V is higher than the reference value Vref at step S130, the HVECU 70 checks the value of the slip flag Fs (step S140). When the slip flag Fs is equal to the value 0, the HVECU 70 determines that no idling-induced slip occurs in either of the front wheels 39a and 39b and the rear wheels 39c and 39d (no slip is detected), sets a value 0 to the rear wheel distribution ratio kr (step S160) and then terminates this routine.

When the slip flag Fs is equal to the value 1 at step S140, on the other hand, the HVECU 70 determines that an idling-induced slip occurs in either of the front wheels 39a and 39b and the rear wheels 39c and 39d (a slip is detected), sets the value kr1 described above to the rear wheel distribution ratio kr (step S150) and then terminates this routine. When the vehicle speed V is higher than the reference value Vref and the slip flag Fs is equal to the value 0, the rear wheel distribution ratio kr is set equal to the value 0. It is accordingly expected that a slip is likely to occur in the front wheels 39a and 39b out of the front wheels 39a and 39b and the rear wheels 39c and 39d. When a slip actually occurs by idling of the front wheels 39a and 39b (when a slip is detected), the rear wheel distribution ratio kr is changed from the value 0 to the value kr1. This reduces the torque of the front wheels 39a and 39b and thereby lowers the degree of (or eliminates) the slip caused by idling of the front wheels 39a and 39b.

When the low μ road flag Fμ is equal to the value 1 at step S110, the HVECU 70 determines that the current driving road is a low μ road and checks the value of the turning flag Ft (step S120). When the turning flag Ft is equal to the value 0, the HVECU 70 determines that the vehicle is not currently turned (but runs straight) and performs the processing of and after step S130 described above.

When the turning flag Ft is equal to the value 1 at step S120, on the other hand, the HVECU 70 determines that the vehicle is currently turned and checks the value of the slip flag Fs (step S170). When the slip flag Fs is equal to the value 0, the HVECU 70 determines that no idling-induced slip occurs in either of the front wheels 39a and 39b and the rear wheels 39c and 39d (no slip is detected), sets a value kr2 (for example, about 0.6 to 0.8) in a range that is larger than the value kr1 described above and that is equal to or smaller than a value krlim, which is equal to or smaller than a value krrat, to the rear wheel distribution ratio kr (step S180) and then terminates this routine. The value kr2 is specifically set in a range equal to or smaller than the value krlim, based on the vehicle speed V, the acceleration α, the steering angle θs and the road surface gradient θrd, such as to ensure the good turning performance. According to the embodiment, a relationship of the value kr2 to the vehicle speed V, the acceleration α, the steering angle θs and the road surface gradient θrd is determined and stored in advance in the form of a map in the ROM (not shown). The value kr2 corresponding to given values of the vehicle speed V, the acceleration α, the steering angle θs and the road surface gradient θrd is read from this map. According to a modification, the value kr2 may be set without taking account of the vehicle speed V or the road surface gradient θrd.

Figure 3:
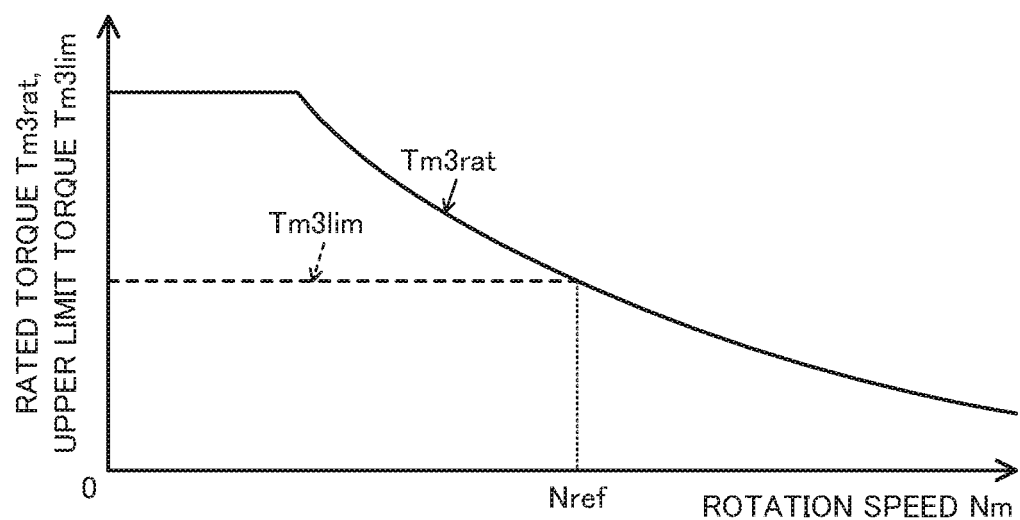
FIG. 3 is a diagram illustrating one example of relationships of rated torque and upper limit torque to the rotation speed of motor MG3.

The value krrat denotes the rear wheel distribution ratio kr to provide the torque of the motor MG3 equal to a rated torque Tm3rat and is obtained by dividing the rated torque Tm3rat based on the rotation speed Nm3 of the motor MG3 by the required torque Td*. The value krlim denotes the rear wheel distribution ratio kr to provide the torque of the motor MG3 equal to or lower than an upper limit torque Tm3lim and is obtained by dividing the upper limit torque Tm3lim based on the rotation speed Nm3 of the motor MG3 by the required torque Td*. The upper limit torque Tm3lim is a torque that is equal to or lower than a torque allowing for continuous use of the motor MG3 (suppressing overheat even in the case of continuous use) and that provides rather good turning performance at the road surface gradient θrd (which takes a positive value in an ascending slope) equal to or less than a reference value θrdref (for example, 4%, 5%, or 6%), and is determined in a range equal to or lower than the rated torque Tm3rat of the motor MG3. FIG. 3 is a diagram illustrating one example of relationships of the rated torque Tm3rat and the upper limit torque Tm3lim to the rotation speed Km3 of the motor MG3. In the illustrated example of FIG. 3, the rated torque Tm3rat of the motor MG3 and the upper limit torque Tm3lim are set to an identical value in a range of the rotation speed Nm3 of the motor MG3 equal to or higher than a reference value Nref, while being set such that the upper limit torque Tm3lim is lower than the rated torque Tm3rat in a range of the rotation speed Nm3 of the motor MG3 lower than the reference value Nref.

The inventors have found that turning on a low μ road is likely to provide poorer turning performance and to cause understeer, compared with turning on a non-low μ road. According to the embodiment, the higher rear wheel distribution ratio kr is accordingly set to increase the torque of the rear wheels 39c and 39d in the case of turning on a low μ road, compared with the ratios in the case of turning on a non-low μ road and in the case of no turning. This ensures the good turning performance (line traceability and stability) on the low μ road.

When the slip flag Fs is equal to the value 1 at step S170, on the other hand, the HVECU 70 determines that an idling-induced slip occurs in either of the front wheels 39a and 39b and the rear wheels 39c and 39d (a slip is detected), sets a value kr3 (for example, 0.0 to 1.0) in a range equal to or smaller than the value krrat, to the rear wheel distribution ratio kr (step S190) and then terminates this routine.

The value kr3 is specifically set in the range equal to or smaller than the value krrat, based on the vehicle speed V, the acceleration α, the steering angle θs and the road surface gradient θrd, such as to limit the output of the motor corresponding to the side having a slip out of the front wheels 39a and 39b and the rear wheels 39c and 39d and to ensure the good turning performance. More specifically, this value kr3 is set to a value (for example, about 0.6 to 1.0) in a range that is larger than the value kr1 and that is equal to or smaller than the value krrat when a slip occurs by idling of the front wheels 39a and 39b, while being set to a relatively small value (for example, about 0.0 to 0.4) when a slip occurs by idling of the rear wheels 39c and 39d. According to the embodiment, a relationship of the value kr3 to the vehicle speed V, the acceleration α, the steering angle θs and the road surface gradient θrd is determined and stored in advance in the form of a map in the ROM (not shown). The value kr3 corresponding to given values of the vehicle speed V, the acceleration α, the steering angle θs and the road surface gradient θrd is read from this map. According to a modification, the value kr3 may be set without taking account of the vehicle speed V or the road surface gradient θrd.

Such control lowers the degree of (or eliminates) the slip in the wheels having the idling induced-slip out of the front wheels 39a and 39b and the rear wheels 39c and 39d and ensures the good turning performance.

As described above, the hybrid vehicle 20 of the embodiment sets the higher rear wheel distribution ratio kr in the case of turning on a low μ road, compared with the ratios in the case of turning on a non-low μ road and in the case of no turning. This ensures the good turning performance (line traceability and stability) on the low μ road.

When no idling-induced slip occurs in either of the front wheels 39a and 39b and the rear wheels 39c and 39d in the case of turning on a low μ road (when no slip is detected), the hybrid vehicle 20 of the embodiment sets the rear wheel distribution ratio kr in the range equal to or smaller than the value krlim (the value corresponding to the upper limit torque Tm3*lim* of the motor MG3). This configuration ensures the good turning performance, while suppressing an increase in amount of heat generation in the motor MG3 and the inverter 43 and suppressing overheat of the motor MG3 and the inverter 43. As described above, the motor MG3 is unlikely to be sufficiently cooled down, compared with the motors MG1 and MG2. Accordingly setting the rear wheel distribution ratio kr in the range equal to or smaller than the value krlim is of great significance in some embodiments.

When a slip occurs by idling of the front wheels 39a and 39b in the case of turning on a low μ road (when a slip is detected), on the other hand, the hybrid vehicle 20 of the embodiment sets the rear wheel distribution ratio kr in the range equal to or smaller than the value krrat (the value corresponding to the rated torque Tm3*rat* of the motor MG3). This configuration expands the possible range of the rear wheel distribution ratio kr (i.e., increases the upper limit of the rear wheel distribution ratio kr), compared with the configuration that sets the rear wheel distribution ratio kr in the range equal to or smaller than the value krlim. This accordingly ensures the sufficiently better turning performance, while lowering the degree of (or eliminating) the slip caused by idling of the front wheels 39a and 39b.

Figure 4:
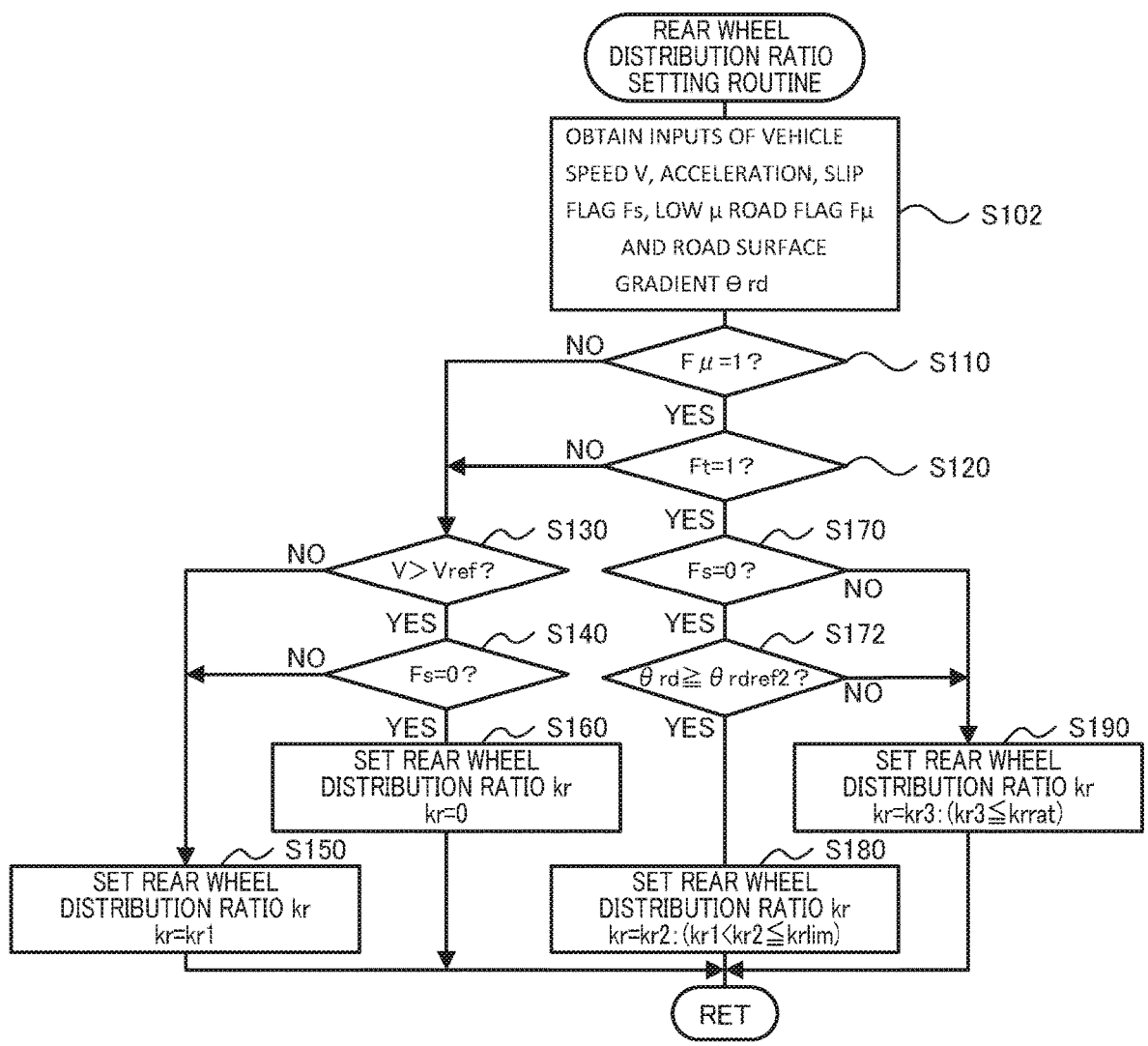
FIG. 4 is a flowchart showing one example of the rear wheel distribution ratio setting routine according to a modification.

In the hybrid vehicle 20 of the embodiment, the HVECU 70 performs the rear wheel distribution ratio setting routine of FIG. 2. According to a modification, the HVECU 70 may alternatively perform a rear wheel distribution ratio setting routine of FIG. 4. The rear wheel distribution ratio setting routine of FIG. 4 is similar to the rear wheel distribution ratio setting routine of FIG. 2, except replacement of the process of step S100 with the process of step S102 and addition of the process of step S172. The like processes are expressed by the like step numbers, and their detailed description is omitted.

When the rear wheel distribution ratio setting routine of FIG. 4 is triggered, the HVECU 70 obtains the input of the road surface gradient θrd from the gradient sensor 90, in addition to the inputs of the vehicle speed V, the acceleration α, the slip flag Fs, the low μ road flag Fμ and the turning flag Ft like the process of step S100 in the rear wheel distribution ratio setting routine of FIG. 2 (step S102).

When the low μ road flag Fμ is equal to the value 1 at step S110, the turning flag Ft is equal to the value 1 at step S120 and the slip flag Fs is equal to the value 0 at step S170, the HVECU 70 determines that the current driving road is a low μ road, that the vehicle is currently turned, and that no idling-induced slip occurs in either of the front wheels 39a and 39b and the rear wheels 39c and 39d (no slip is detected) and compares the road surface gradient θrd with a reference value θrdref2 (step S172). The reference value θrdref2 used here may be, for example, an identical value with the reference value θrdref described above.

When the road surface gradient θrd is equal to or greater than the reference value θrdref2 at step S172, the HVECU 70 sets the value kr2 described above to the rear wheel distribution ratio kr (step S180) and then terminates this routine. When the road surface gradient θrd is less than the reference value θrdref2, on the other hand, the HVECU 70 sets the value kr3 described above to the rear wheel distribution ratio kr (step S190) and then terminates this routine.

At the large road surface gradient θrd, it is likely to increase the accelerator position Acc, the required torque Td* and thereby the torque command Tm3* of the motor MG3 (amount of heat generation) over a certain time period. Accordingly, when the road surface gradient θrd is equal to or greater than the reference value θrdref2, setting the rear wheel distribution ratio kr in the range equal to or smaller than the value krlim (the value corresponding to the upper limit torque Tm3*lim* of the motor MG3) ensures the good turning performance, while suppressing overheat of the motor MG3 and the inverter 43.

At the small road surface gradient θrd, on the other hand, even when the required torque Td* and thereby the torque of the motor MG3 increase, it is unlikely to continue such increases over a long time period. Accordingly, when the road surface gradient θrd is less than the reference value θrdref2, setting the rear wheel distribution ratio kr in the range equal to or smaller than the value krrat (the value corresponding to the rated torque Tm3*rat* of the motor MG3) ensures the sufficiently better turning performance, while expanding the possible range of the rear wheel distribution ratio kr.

In the hybrid vehicle 20 of the embodiment, the upper limit torque Tm3*lim* is set based on the rotation speed Nm3 of the motor MG3 as shown in FIG. 3. According to a modification, the upper limit torque Tm3*lim* may be set based on the road surface gradient θrd in addition to the rotation speed Nm3 of the motor MG3. In this modification, the upper limit torque Tm3*lim* may be set to decrease with an increase in the road surface gradient θrd. This is because it is likely to increase the accelerator position Acc, the required torque Td* and thereby the torque command Tm3* of the motor MG3 (amount of heat generation) over a certain time period at the large road surface gradient θrd as described above.

The hybrid vehicle 20 of the embodiment uses the battery 50 as the power storage device. A capacitor may be used as the power storage device, in place of the battery 50.

The hybrid vehicle 20 of the embodiment is equipped with the engine ECU 24, the motor ECU 40, the battery ECU 52 and the HVECU 70. At least two of these ECUs may be configured by a single electronic control unit.

Figure 5:
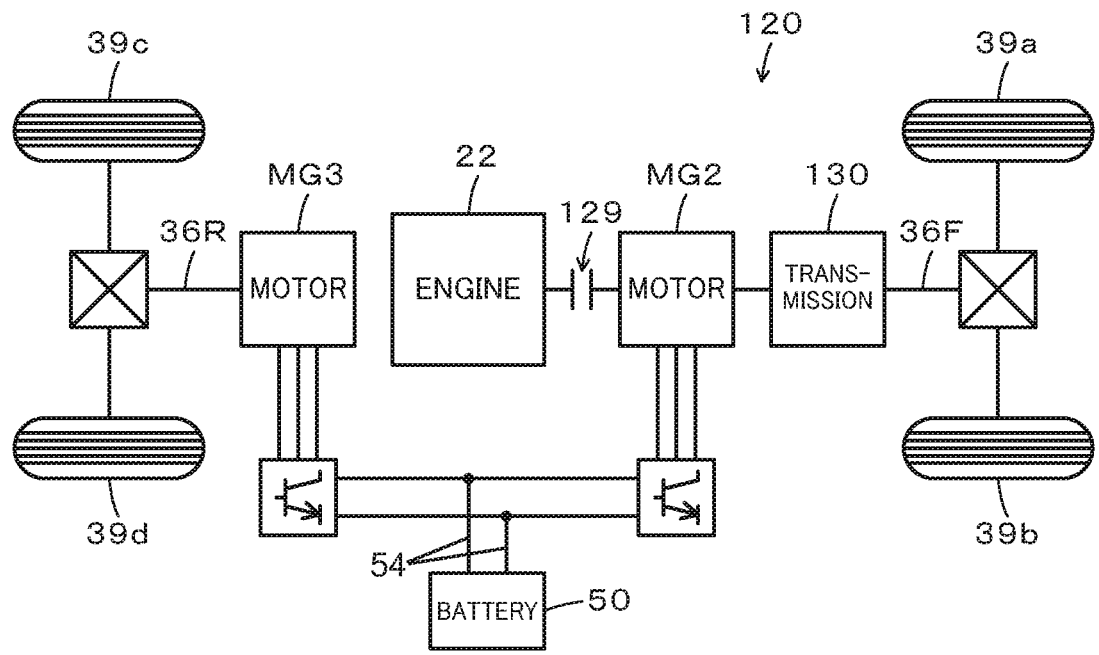
FIG. 5 is a configuration diagram illustrating the schematic configuration of a hybrid vehicle according to a modification.
Figure 6:
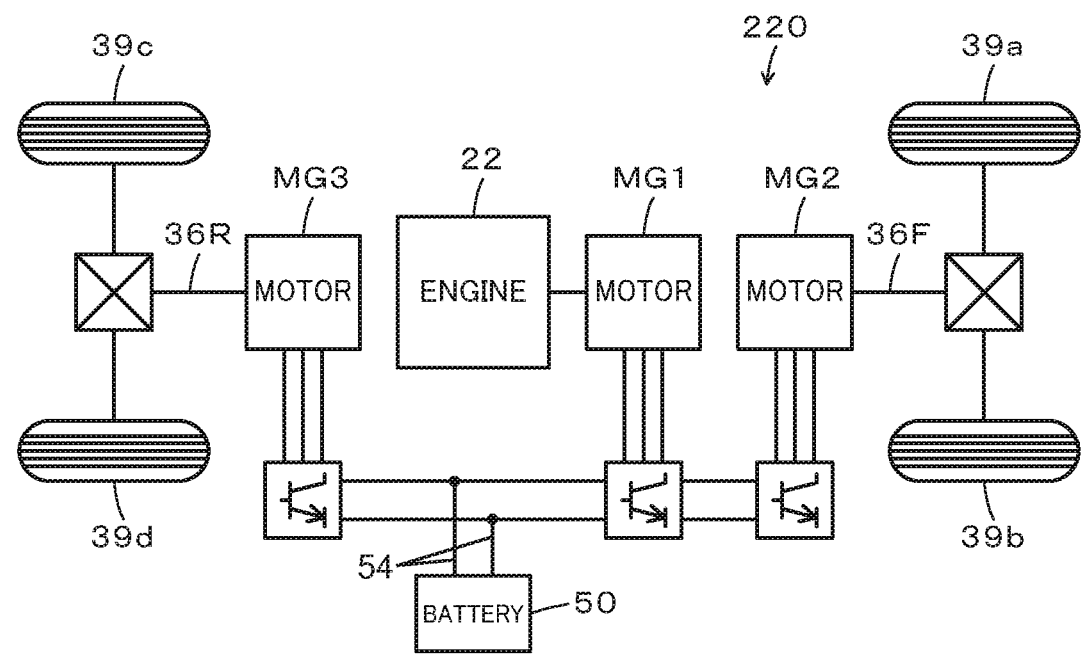
FIG. 6 is a configuration diagram illustrating the schematic configuration of another hybrid vehicle according to another modification.
Figure 7:
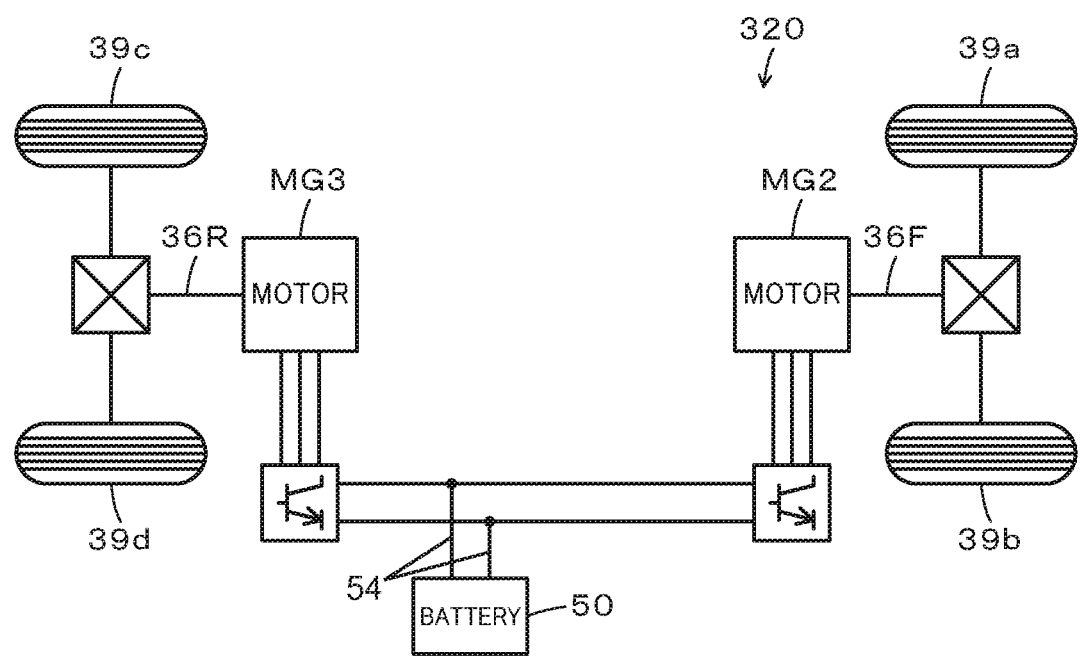
FIG. 7 is a configuration diagram illustrating the schematic configuration of an electric vehicle according to another modification.

The embodiment describes the application of the present disclosure to the hybrid vehicle 20 configured such that the engine 22 and the motor MG1 are connected via the planetary gear 30 with the driveshaft 36F coupled with the front wheels 39a and 39b, that the motor MG2 is connected with the driveshaft 36F, that the motor MG3 is connected with the driveshaft 36R coupled with the rear wheels 39c and 39d, and that the battery 50 is connected with the motors MG1, MG2 and MG3 via the power lines 54 as shown in FIG. 1. The present disclosure is also applicable to a hybrid vehicle 120 according to a modification configured such that a motor MG2 is connected via a transmission 130 with the driveshaft 36F coupled with the front wheels 39a and 39b, that the engine 22 is connected with the motor MG2 via a clutch 129, that a motor MG3 is connected with the driveshaft 36R coupled with the rear wheels 39c and 39d, and that the battery 50 is connected with the motors MG2 and MG3 via the power lines 54 as shown in FIG. 5. The present disclosure is also applicable to a series hybrid vehicle 220 according to another modification configured such that a motor MG1 for power generation is connected with the engine 22, that a motor MG2 for driving is connected with the driveshaft 36F coupled with the front wheels 39a and 39b, that a motor MG3 is connected with the driveshaft 36R coupled with the rear wheels 39c and 39d, and that the battery 50 is connected with the motors MG1, MG2 and MG3 via the power lines 54 as shown in FIG. 6. The present disclosure is further applicable to an electric vehicle 320 according to another modification configured such that a motor MG2 is connected with the driveshaft 36F coupled with the front wheels 39a and 39b, that a motor MG3 is connected with the driveshaft 36R coupled with the rear wheels 39c and 39d and that the battery 50 is connected with the motors MG2 and MG3 via the power lines 54 as shown in FIG. 7.

In the motor vehicle of this aspect, when the motor vehicle runs on the low μ road and is currently turned, the control device may set the rear wheel distribution ratio such that a torque of the second motor becomes equal to or lower than an upper limit torque that is determined to be lower than a rated torque in at least a range of lower than a predetermined rotation speed of the second motor. This configuration ensures good turning performance, while suppressing an increase in amount of heat generation in the second motor and suppressing overheat of the second motor, compared with a configuration that sets the rear wheel distribution ratio such as to provide the torque of the second motor that is equal to or lower than the rated torque.

In this case, when the motor vehicle runs on the low μ road and is currently turned, in response to detection of a slip caused by idling of the front wheels, the control device may set the rear wheel distribution ratio such that the torque of the second motor becomes equal to or lower than the rated torque. This configuration expands the possible range of the rear wheel distribution ratio (i.e., increases the upper limit), compared with a configuration that sets the rear wheel distribution ratio such as to provide the torque of the second motor that is equal to or lower than the upper limit torque. This ensures the sufficiently better turning performance, while lowering the degree of (or eliminating) a slip caused by idling of the front wheels.

Further in this case, when the motor vehicle runs on the low μ road and is currently turned, the control device may set the rear wheel distribution ratio such that the torque of the second motor becomes equal to or lower than the rated torque at a road surface gradient that is less than a predetermined gradient, while setting the rear wheel distribution ratio such that the torque of the second motor becomes equal to or lower than the upper limit torque at the road surface gradient that is equal to or greater than the predetermined gradient. This is because of the following. At a large road surface gradient, it is likely to increase the required torque and thereby the torque of the second motor (amount of heat generation) over a certain time period. At a small road surface gradient, on the other hand, even when the torque of the second motor increases, it is unlikely to continue this increase over a long time period.

Further in this case, the upper limit torque may be set to decrease with an increase in road surface gradient. This is because of the following. At a large road surface gradient, it is likely to increase the required torque and thereby the torque of the second motor (amount of heat generation) over a certain time period.

The following describes the correspondence relationship between the primary components of the embodiment and the primary components of the disclosure described in Summary. The motor MG2 corresponds to the "first motor", the motor MG3 corresponds to the "second motor", and the HVECU 70 and the motor ECU 40 correspond to the "control device".

The correspondence relationship between the primary components of the embodiment and the primary components of the disclosure, regarding which the problem is described in the Summary, should not be considered to limit the components of the disclosure, regarding which the problem is described in the Summary, since the embodiment is only illustrative to specifically describe the aspects of the disclosure, regarding which the problem is described in the Summary. In other words, the disclosure, regarding which the problem is described in the Summary, should be interpreted on the basis of the description in the Summary, and the embodiment is only a specific example of the disclosure, regarding which the problem is described in the Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the motor vehicle and so on.

The invention claimed is:

1. A motor vehicle, comprising:
a first motor configured to drive front wheels;
a second motor configured to drive rear wheels; and
a control device configured to control the first motor and the second motor such that the motor vehicle is driven with a required torque for driving, wherein
the control device controls the first motor and the second motor to set a larger value to a rear wheel distribution ratio that is a ratio of a torque of the rear wheels to the required torque, when the motor vehicle runs on a low μ road having a road surface friction coefficient equal to or less than a predetermined value and the motor vehicle is currently turned, compared with a value when the motor vehicle does not run on the low μ road or when the motor vehicle is not currently turned.

2. The motor vehicle according to claim 1,
wherein when the motor vehicle runs on the low μ road and is currently turned, the control device sets the rear wheel distribution ratio such that a torque of the second motor becomes equal to or lower than an upper limit torque that is determined to be lower than a rated torque in at least a range of lower than a predetermined rotation speed of the second motor.

3. The motor vehicle according to claim 2,
wherein when the motor vehicle runs on the low μ road and is currently turned, in response to detection of a slip caused by idling of the front wheels, the control device sets the rear wheel distribution ratio such that the torque of the second motor becomes equal to or lower than the rated torque.

4. The motor vehicle according to claim 2,
wherein when the motor vehicle runs on the low μ road and is currently turned, the control device sets the rear wheel distribution ratio such that the torque of the second motor becomes equal to or lower than the rated torque at a road surface gradient that is less than a predetermined gradient, while setting the rear wheel distribution ratio such that the torque of the second motor becomes equal to or lower than the upper limit torque at the road surface gradient that is equal to or greater than the predetermined gradient.

5. The motor vehicle according to claim 2,
wherein the upper limit torque is set to decrease with an increase in road surface gradient.

* * * * *